United States Patent [19]
Cobbe, Jr.

[11] 3,970,284
[45] July 20, 1976

[54] SAFETY DEVICE FOR USE WITH CHLORINE CYLINDER VALVES

[76] Inventor: George H. Cobbe, Jr., 3411 S. Camino Seco No. 46, Tucson, Ariz. 85730

[22] Filed: Apr. 7, 1975

[21] Appl. No.: 566,033

[52] U.S. Cl. ............................................. 251/149.9
[51] Int. Cl.² ...................................... F16L 29/00
[58] Field of Search................. 251/149.9; 137/382, 137/382.5; 285/80, 81, 87, 88, 82; 220/85 R, 85 E, 85 P

[56] References Cited
UNITED STATES PATENTS 2,327,654  9/1943  McIntosh .................... 251/149.9 X
3,125,322  3/1964  Halstead ........................ 251/149.9

FOREIGN PATENTS OR APPLICATIONS
565,455  11/1923  France ............................ 251/149.9

Primary Examiner—William R. Cline
Attorney, Agent, or Firm—Cahill, Sutton & Thomas

[57] ABSTRACT

A shroud for use with standard chlorine cylinder mounted valves is disclosed. The shroud is rotatably positionable commensurate with the opening of the valve to restrain access to the valve outlet fitting and thereby prevent disconnection of an attached outlet pipe while the valve is partially or fully open.

3 Claims, 7 Drawing Figures

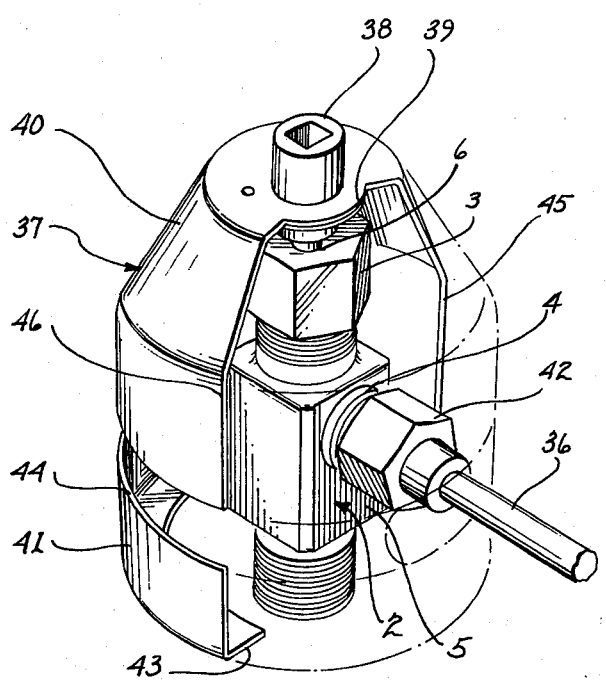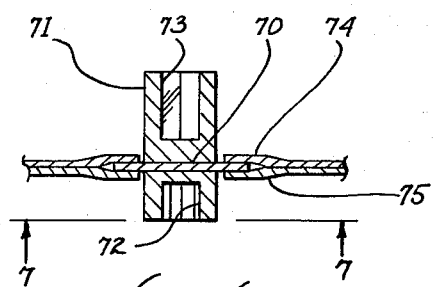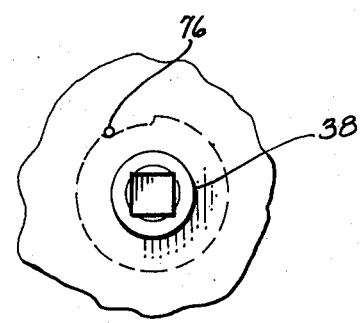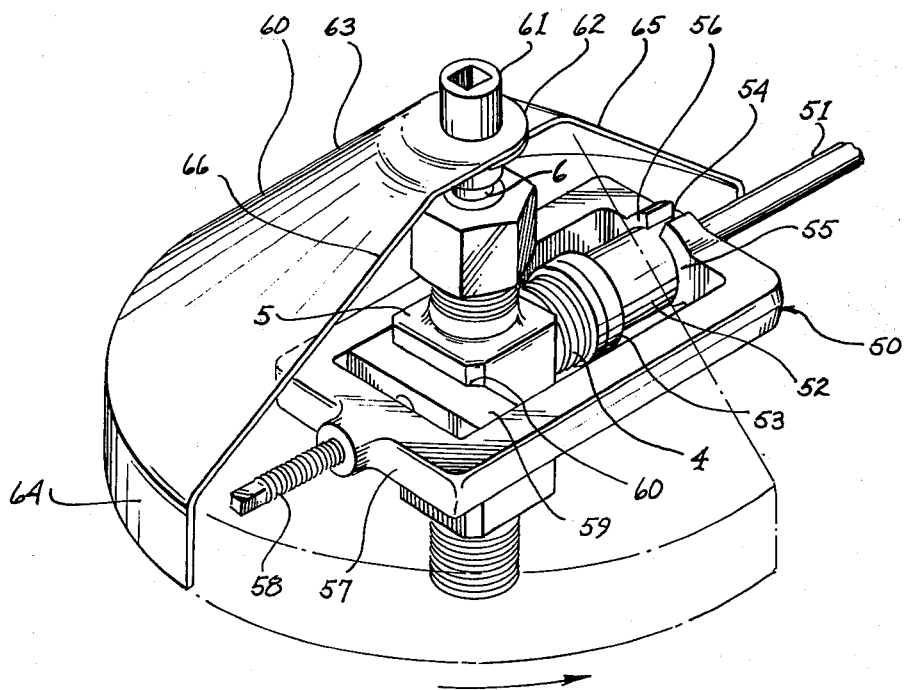

SAFETY DEVICE FOR USE WITH CHLORINE CYLINDER VALVES

The present invention relates to safety devices and, more particularly, to safety devices for use in conjunction with valves for chlorine cylinders.

Chlorine, whether in a gaseous or liquid state, is widely used an many industrial and commercial locations and poses many hazards of which the following is a summary. Chlorine gas is respiratory irritant and may, in extreme cases, cause death from suffocation. Hence, adequate precautions must be taken to prevent injury to personnel working with or in proximity to chlorine gas. While chlorine is neither explosive nor flammable, it will support combustion and it reacts with almost all elements, reaction generates heat and further exacerbates the reactive process. Moreover, chlorine, in the presence of moisture, will rapidly corrode the attendant piping, valves and containers. Because of these health, fire, chemical and corrosive hazards, chlorine must be handled with extreme caution.

In the evolutionary process of attempting to establish adequate controls and precautionary measures, the Chlorine Institute has developed a standard valve for use with cylinders containing chlorine which valve is now used throughout the industry.

When a chlorine cylinder is emptied or when the pressure therein drops below a predetermined value, both the cylinder and the attached valve are replaced as a unit. During replacement, the outlet pipe or regulator apparatus attached to the valve outlet fitting must necessarily be disconnected. During such disconnection, despite extensive training, the valve is sometimes left partially or fully open. Should this occur, the above enumerated hazards immediately come into being with attendant potential or actual injury to personnel or equipment.

In the prior art, many devices have been developed for use in conjunction with various types of valves to prevent disengagement of the outlet pipe from the valve while the latter is open or to protect the valve itself. In U.S. Pat. No. 2,327,654, a guard is disclosed for use in conjunction with a gate valve. U.S. Pat. No. 1,963,452, illustrates a device for detecting automatic shut-off upon the establishment of a predetermined pressure differential about either side of the diaphragm. The following United States patents illustrate various means for lockingly enclosing a valve body attached to a cylinder or container: U.S. Pat. Nos. 770,043, 2,679,332, 3,323,541, 3,406,708 and 3,831,802.

By inspection, it becomes apparent that none of the prior art devices describe nor suggest a safety device which is useable in conjunction with a flow regulating valve and which device tends to prevent access to the valve outlet fitting whenever the valve is partially or fully opened. Moreover, none of the prior art devices permit regulation of the rate of flow while the shroud is in place.

It is a primary object of the present invention to provide a safety device for use with chlorine dispensing valves which restrains disconnection of an attached outlet pipe while the valve is partially or fully open.

Another object of the present invention is to provide a shroud for chlorine dispensing valves which is supported by the valve stem.

Still another object of the present invention is to provide a shroud for chlorine dispensing valves which does not impede rotation of the valve stem.

Yet another object of the present invention is to provide a safety device for use with flow regulating valves having a laterally directed outlet.

A further object of the present invention is to provide a valve stem mounted shroud for valves which permits disconnection of a laterally extending outlet pipe only while the valve stem is rotated fully clockwise.

A still further object of the present invention is to provide a clutch intermediate a shroud and the valve stem to accommodate mounting of the shroud regardless of the orientation of the valve stem.

A yet further object of the present invention is to provide an inexpensive safety device for use in conjunction with chlorine dispensing valves.

These and other objects of the present invention will become apparent to those skilled in the art as the description thereof proceeds.

The present invention may be described with greater specificity and clarity with reference to the following drawings, in which:

FIG. 4 illustrates a variant of the present invention.

FIG. 5 illustrates a further variant of the present invention.

FIG. 6 is a cross-sectional view of a clutch mechanism used to mount the present invention upon a valve stem.

FIG. 7 is a bottom view of the clutch taken along lines 7—7, as shown in FIG. 6.

Figure 1:
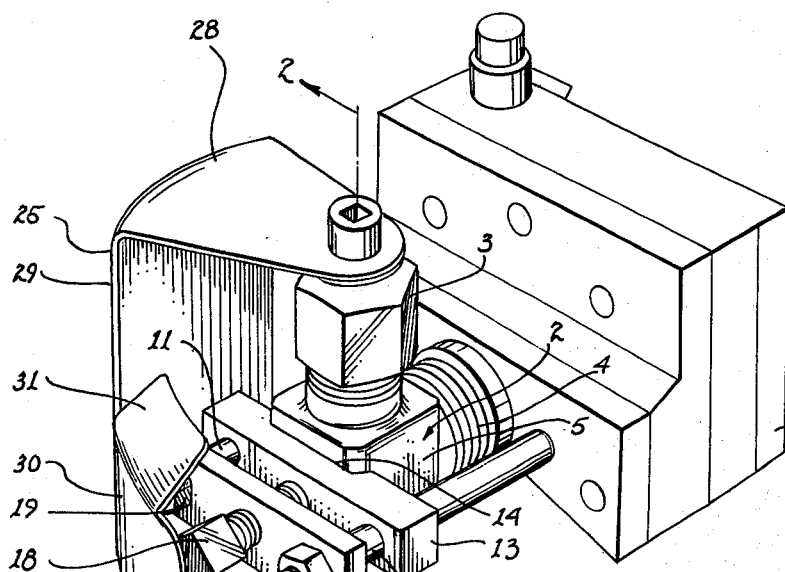
FIG. 1 illustrates the present invention attached to a valve mounted upon a cylinder.
Figure 2:
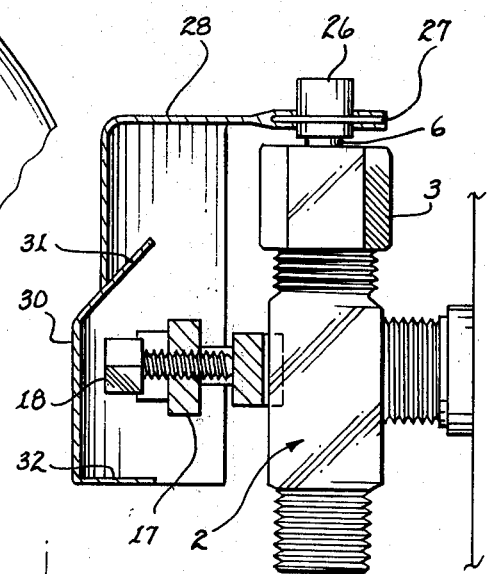
FIG. 2 is a side view of the present invention taken along lines 2—2, as shown in FIG. 1.
Figure 3:
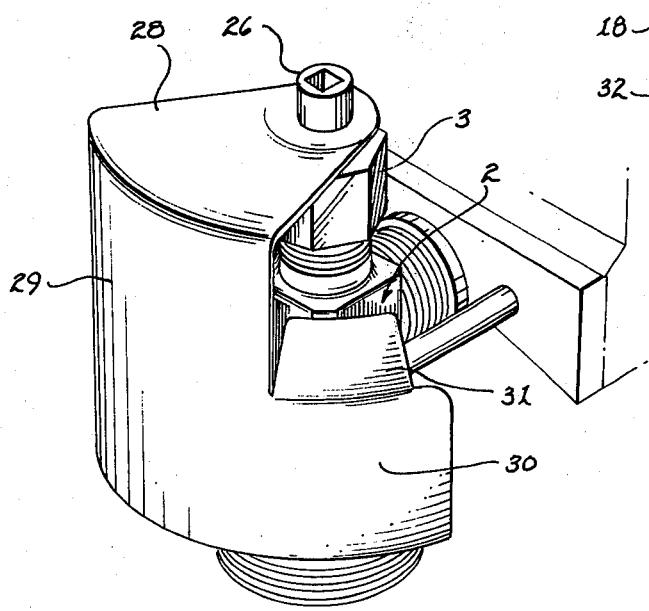
FIG. 3 illustrates the shielding effect provided by the present invention whenever the valve stem is rotated counterclockwise to open the valve.

Referring jointly to FIGS. 1, 2 and 3, there is shown a chlorine filled cylinder 1 having a Chlorine Institute standard valve 2 mounted thereon. A valve stem, controlling the flow rate through the valve, extends upwardly external to valve 2 through the center of a union nut 3. Discharge from the valve is effected through a fitting 4 extending laterally from valve body 5.

A chlorine regulator 10, which may be any one of several commercially available regulators, is in sealing engagement with the orifice of valve outlet fitting 4. Regulator 10 is attached to valve 2 by a pair of threaded studs 11 and 12, which studs are spaced apart from one another to receive valve body 5 therebetween. A bar 13 is apertured to penetratingly receive studs 11 and 12. A depression 14 is disposed in one side of the bar, which depression mates with a corresponding side of the valve body. A plate 17 is apertured to penetratingly receive the threaded ends of studs 11 and 12. In addition, a threaded aperture is disposed within the plate 17 to threadedly receive a bolt 18. Plate 17 is retained upon the studs by means of nuts 19 and 20 which engage the threads of the studs.

The regulator is mounted upon valve 2 by having studs 11 and 12 straddle the valve body and positioned with respect to fitting 4 such that the orifice thereof engages a similarly sized inlet within the regulator. Bar 13 and plate 17 with bolt 18 are mounted upon the studs, as illustrated in FIG. 1. The regulator is drawn toward valve 2 to effect a seal therebetween by turning bolt 18. By turning bolt 18, plate 17 is displaced laterally with respect to bar 13. Lateral displacement of plate 17, which displacement is translated through the studs to the regulator, draws the regulator into sealing engagement with fitting 4.

To prevent turning of bolt 18 and attendant disengagement of regulator 10 from valve 2 and breaking the seal therebetween when the valve is partially or fully open, a shroud 25 is attached to the protruding part of valve stem 6 by means of a dual recessed socket 26 and clutch 27. A generally horizontally oriented pie-shaped section 28 of the shroud extend laterally from the valve stem and is terminated by a depending longitudinally oriented arcuate shield 29. The lower part of shield 29 may include a circumferentially extending element 30 having an upper inwardly directed lip 31. The lower edge of shield 29 and element 30 is terminated by an inwardly radially extending flange 32.

The total arc defined by shield 29 and element 30 is generally commensurate with the arc defined by the valve stem when turned counterclockwise from a closed to an open position. Shroud 25 is oriented about the valve body such that when the valve is open (valve stem in the most counterclockwise position) shield 29, element 30, lip 31 and flange 32 effectively inhibit longitudinal and lateral access to bolt 18. When the valve is closed (valve stem is in its clockwise most position), the shroud is sufficiently angularly displaced to permit lateral access to bolt 18. Thus, bolt 18 can be tightened or loosened, as required, when the shroud is in its most clockwise position. As soon as the valve stem is turned counterclockwise to open the valve, the commensurate movement of element 30, particularly, lip 31 and flange 32, severely restricts, if not prohibits, access to bolt 18. Obviously, further counterclockwise rotation of the valve stem increasingly restricts access to the bolt.

Depending upon the type and nature of regulator 10, rotation of the shroud commensurate with the rotation of the valve stem may be more or less impeded. In the event no impediment exists, shield 29 can define an arc equivalent to the angle through which the valve stem is turned and element 30 may be eliminated. Where an impediment is present, the shroud may have to extend across the head of bolt 18 in order to ensure that longitudinally oriented access to the bolt is impeded at any open position of the valve stem. In such case, lateral access to the bolt must be possible when the valve stem is closed. The configuration of element 30 provides such access. Hence, the configuration shown in FIG. 1 is particularly useful in applications having a regulator which prevents unrestricted movement of shroud 25.

A first variant of the present invention will be described with respect to FIG. 4. When fitting 4 of valve 2 is connected to an outlet pipe 36 instead of a regulator, a more compact and differently configured shroud 37 is employable. Shroud 37 is attached to valve stem 6 by means of a dual recessed socket 38 and clutch 39. The upper section 40 of shroud 37 is cone-shaped to accommodate clearance of union nut 3 and valve body 5. A partial cylindrical section 41 depends downwardly from the periphery of section 40 and is of a diameter sufficient to clear not only valve body 5 but also fitting 4 and its engaged union nut 42. The lower edge of cylindrical section 41 is terminated by a radially inwardly extending flange 43. The cone-shaped section, the cylindrical section and the flange terminate at laterally displaced vertical edges 45, 46 to establish a void for accommodating mounting of the shroud without interference from outlet pipe 36. Rotating of shroud 37 commensurate with rotation of the valve stem with respect to the outlet pipe is accommodated by means of a horizontally oriented recess 44 disposed within the cylindrical section.

Shroud 37 is mounted by engaging socket 38 with the extending end of valve stem 6. Some reorientation of socket 38 with respect to the shroud may be necessary by means of clutch 39 to position edge 46 in proximity to union nut 42 but yet not have the shroud impede attachment or removal of outlet pipe 36. After shroud 37 has been mounted about valve 2, edge 46 will shieldingly pass union nut 42 whenever the valve stem is even partially opened (turned counterclockwise) by turning socket 38. As the socket is turned, outlet pipe 36 will become engaged within recess 44. Necessarily, the arc defined by the recess must be commensurate with or somewhat greater than the arc through which the valve stem is turned.

From this description it will become apparent that as soon as valve 2 is partially cracked open, edge 46 of the shroud will tend to impede removal of outlet pipe 36 by restricting access to union nut 42. Hence, the shroud effectively prevents removal or disengagement of the outlet pipe whenever valve 2 is partially or fully open.

FIG. 5 illustrates a further variant of the present invention, which variant is directed to a Chlorine Institute yoke 50. For some applications, an outlet pipe 51 is attached to fitting 4 by means of a pressure fit. In such an instance, a cylindrically shaped collar 52 is disposed adjacent seat 53, which seat engages the orifice of fitting 4. End 49 of yoke 50 includes a slot 54 for receiving outlet pipe 51. The end face 55 of collar 52 rests against inside shoulder 56 of the yoke. A bolt 58 threadedly extends through end 57 of yoke 50 to act upon a bar 59 to cause translational movement thereof and force the valve body 5 toward end 49. By inspection, it becomes clear that by translating bar 59, the periphery of the orifice within fitting 4 is forced against seat 53 and into sealing engagement therewith. Lateral displacement of the yoke about the valve is prevented by depression 60 within yoke about the valve is prevented by depression 60 within bar 59 which mates with one surface of the valve body. Hence, the yoke provides a means for effective sealed engagement between the outlet of valve 2 and the end of outlet pipe 51.

To prevent inadvertent disengagement of seat 53 while valve 2 is partially or fully open, a shroud 60 is attached to valve stem 6 by means of socket 61 and clutch 62. The shroud is formed as a cutaway cone 63 having a depending flange 64. The maximum arc is defined by edges 65 and 66 of shroud 60. This arc is determined by having edge 65 positioned essentially adjacent output pipe 51 and locating edge 66 at a position which affords access to bolt 58. It may be well to point out that valve 2 is closed when the valve stem is in the clockwise most position, as illustrated in FIG. 5.

As soon as valve 2 is opened by turning the valve stem in a counterclockwise direction, edge 66 of shroud 60 will shieldingly engage bolt 58 so as to at least impede access to the bolt. Further opening of the valve by further turning of the valve stem will necessarily rotate the shroud so as to fully shield the bolt. When the valve is in the fully open position, the shroud will be located as depicted by the phantom lines in FIG. 5.

From the above description it will become apparent to those skilled in the art that shroud 60 effectively prevents rotation of bolt 58 whenever valve 2 is partially or fully open. Thereby, disconnection of output pipe 51 from valve 2 is inhibited whenever the valve is open and the above described hazards are unlikely to occur.

Referring jointly to FIGS. 6 and 7, a brief discussion of the above mentioned clutches will be undertaken. The clutch is formed by welding or otherwise attaching a radially extending annular flange 70 about a socket 71. The socket may include a pair of recesses 72 and 73 which may or may not be in communication with one another. Recess 72 is configured to engage the extending end of the valve stem. Recess 73 is configured to receive an Allen wrench of appropriate size or the stud protruding from a socket wrench.

Socket 71 is attached to one of the above described shrouds by engaging flange 70 intermediate a plate 74 and the upper surface 75 of the shroud. The plate is compressingly urged toward surface 75 by means of adjustable nut and bolt combinations or fixed compression devices such as rivets 76. The degree of compression afforded by the rivets necessarily determines the pressure of plate 74 acting upon flange 70 and the friction therebetween. The amount of friction must be sufficient to cause rotation of the shroud in response to rotation of socket 71; however, the friction must not be so great as to prevent orientation of the socket with respect to the shroud such that recess 72 will engage the valve stem while the valve is closed and the shroud is in the clockwise most position.

Unless the clutch arrangement, such as that described above, is incorporated, it may be difficult to position the shroud upon the valve stem such that the member which ultimately controls retention of the outlet pipe is accessible only while the valve is in closed position and shielded whenever the valve is partially or fully open. A part of the difficulty is due to the wear of the valve seat which results in progressive angular repositioning of the valve stem at the most clockwise (closed) position.

The present invention in any of its embodiments is not intended to prevent absolute non-accessibility to the element retaining the outlet pipe. Instead, the present invention is intended to establish an impediment in disconnecting the outlet pipe if the valve is not closed and thereby remind the workman to close the valve before loosening or disconnecting the outlet pipe.

While the principles of the invention have now been made clear in an illustrative embodiment, there will be immediately obvious to those skilled in the art many modifications of structure, arrangement, proportions, elements, materials, and components used in the practice of the invention which are particularly adapted for specific environments and operating requirements without departing from those principles.

I claim:

1. In a standard chlorine cylinder valve having attaching means for detachably engaging a receiving orifice to a valve outlet fitting, a valve stem mounted shroud for constraining detachment of the receiving orifice unless the valve stem is in the closed position, said shroud comprising in combination:
   a. socket means for engaging the valve stem;
   b. a downwardly extending shroud means depending from said socket means for partially circumscribing the valve, said shroud means being positionable about the valve stem axis commensurate with the rotational position of the valve stem;
   c. clutch means disposed intermediate said socket means and said shroud means for accommodating reorientation of the closed position of the valve stem due to wear while maintaining the position of said shroud means with respect to the valve stem to shield the attaching means whenever the valve stem is rotated from the closed position, said clutch means comprising an annular flange disposed about said socket means, a plate for maintaining said flange against a surface of said shroud means and compression means for frictionally retaining said flange intermediate said plate and said surface, whereby, rotation of said socket means independent of commensurate rotation of said shroud means is frictionally restrained; and
   d. a skirt forming a part of said shroud means for shielding access to the attaching means upon rotation of the valve stem away from the closed position;
whereby, said shroud, by shielding the attaching means whenever the valve stem is rotated from the closed position, constrains disconnection of the outlet pipe from the outlet fitting whenever the valve is partially or fully open.

2. In a standard chlorine cylinder valve havng attaching means for detachably engaging a receiving orifice forming a part of an outlet pipe maintained in position by the attaching means and extending lateral to a valve outlet fitting, a valve stem mounted shroud for constraining detachment of the receiving orifice unless the valve stem is in the closed position, said shroud comprising in combination:
   a. a socket means for engaging the valve stem; and
   b. a downwardly extending shroud means depending from said socket means for partially circumscribing the valve, said shroud means being positionable about the valve stem axis commensurate with the rotational position of the valve stem, and said shroud means comprising:
      i. a section for receiving said socket means, said second being oriented generally normal to the axis of the valve stem;
      ii. a split cone depending from said section, the base of said cone terminating at a radius sufficient to circumscribe the valve and the attaching means;
      iii. an arcuate skirt depending from the base of said cone for partially circumscribing the valve and shielding access to the attaching means upon rotation of the valve stem away from the closed position; and
      iv. a slot disposed within said skirt for receiving the outlet pipe as said shroud is rotated to shield the attaching means and constrain access thereto;
whereby, said shroud, by shielding the attaching means whenever the valve stem is rotated from the closed position, constrains disconnection of the outlet pipe from the outlet fitting whenever the valve is partially or fully open.

3. In a standard chlorine cylinder valve having attaching means for detachably engaging a receiving orifice to a valve outlet fitting, the attaching means including a removable yoke for maintaining the receiving orifice of an outlet pipe adjacent the outlet fitting, a valve stem mounted shroud for constraining detachment of the receiving orifice unless the valve stem is in the closed position, said shroud comprising in combination:

a. socket means for engaging the valve stem; and
b. a downwardly extending shroud means depending from said socket means for partially circumscribing the valve, said shroud means being positionable about the valve stem axis commensurate with the rotational position of the valve stem, said shroud means comprising:
  i. a section for receiving said socket means, said section being oriented generally normal to the axis of the valve stem;
  ii. a split cone depending from said section, the base of said cone terminating at a radius sufficient to circumscribe the yoke; and
  iii. an arcuate skirt depending from the base of said cone for shielding the yoke and constrain removal thereof whenever the valve is partially or fully open;

whereby, said shroud, by shielding the attaching means whenever the valve stem is rotated from the closed position, constrains disconnection of the outlet pipe from the outlet fitting whenever the valve is partially or fully open.

* * * * *